F. ELLWEIN.
TRANSMISSION GEARING.
APPLICATION FILED MAY 18, 1917.

1,241,362.

Patented Sept. 25, 1917.

Inventor
F. Ellwein.
Attorney

UNITED STATES PATENT OFFICE.

FREDERICK ELLWEIN, OF HAZEN, NORTH DAKOTA.

TRANSMISSION-GEARING.

1,241,362.  Specification of Letters Patent.  Patented Sept. 25, 1917.

Application filed May 18, 1917.   Serial No. 169,461.

*To all whom it may concern:*

Be it known that I, FREDERICK ELLWEIN, a citizen of the United States, residing at Hazen, in the county of Mercer and State of North Dakota, have invented certain new and useful Improvements in Transmission-Gearings; and I do hereby declare the following to be a full, clear, and exact description of the invention, such as will enable others skilled in the art to which it appertains to make and use the same.

This invention relates to new and useful improvements in transmission gearing, and is particularly adapted for use on motor vehicles having four wheel drives.

The principal object of the invention is to provide a transmission which is so constructed as to avoid the necessity of using belts, chains or similar devices for driving the propeller shafts after the power has passed through the transmission.

Another object of the invention is to provide a transmission which may be easily and quickly operated and which is provided with roller bearings for reducing the friction to a minimum.

With these and other objects in view, the invention consists in such novel features of construction, combination and arrangement of parts as will be hereinafter more fully described, illustrated in the accompanying drawing and claimed.

Figure 1:
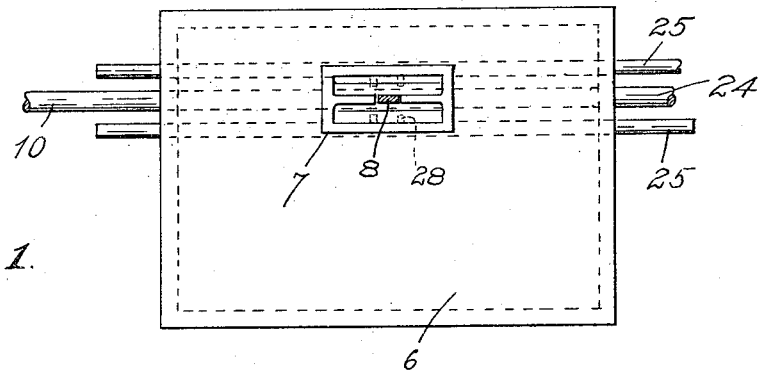
Figure 2:
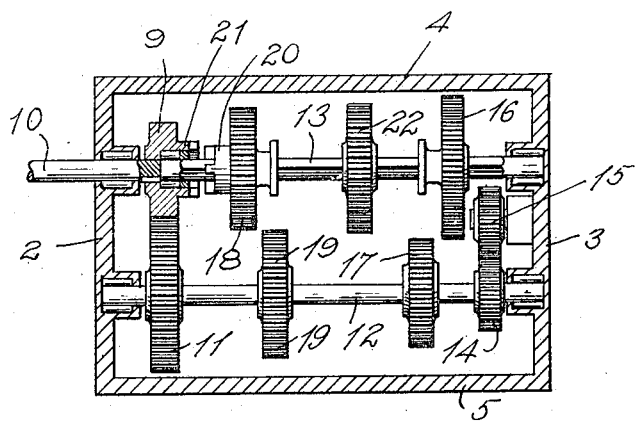
Figure 3:
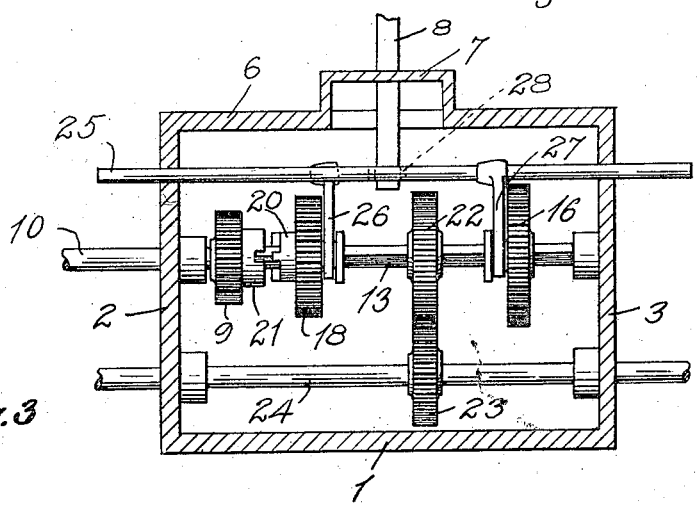

In describing the invention in detail reference will be had to the accompanying drawing wherein like characters designate like and corresponding parts throughout the several views, and in which:

Figure 1 is a top plan view of a transmission casing constructed in accordance with this invention, Fig. 2 is a horizontal sectional view through Fig. 1, and Fig. 3 is a vertical sectional view through Fig. 1.

Referring to the drawing 1 designates the bottom of the device having formed integrally therewith the end walls 2 and 3 and the side walls 4 and 5. A suitable cover plate 6 is provided for the housing and is adapted to be secured to the upper edges of the side and end walls by suitable cap screws, or in any other suitable manner. The usual H plate, designated by the numeral 7, is provided and is formed with the H shaped slot in which the controlling lever 8 for the gear shifting arms is slidable.

Referring to the gearing within the housing the first in order is the driving gear, designated by the character 9, which is mounted on the end of the power shaft 10 leading from the motor. This gear 9 meshes with the gear 11 on the counter shaft, designated by the numeral 12, and mounted in parallel relation to the counter shaft is the idler shaft 13 on which the various speed changing gears are mounted. Mounted at the rear end of the counter shaft is a pinion 14 which meshes with an idler pinion 15, which is adapted to mesh with the pinion 16 mounted on the idler shaft 13. This gear 16 is slidable on the shaft 13 and is adapted to be shifted to mesh with the pinion 15 or the pinion 17 mounted on the counter shaft 12.

It will be apparent that upon shifting the gear 16 to mesh with the gear 17 on the shaft 26, the shaft 13 will be driven in such a direction as to cause the vehicle to move forward at a low speed, whereas upon shifting the gear 16 to mesh with the gear 15 the direction of movement of the vehicle will be reversed at low speed, thus giving the reverse and low speed for the vehicle. The gear 18, which is slidable on the shaft 13, is of smaller diameter than the gear 16 and is adapted to mesh with the gear 19 mounted on the counter shaft 12, and it will be apparent that when the gear 18 is shifted to mesh with the gear 19, the counter shaft 13 will be driven in a forward direction at a speed slightly increased over the speed transmitted through the gear 16. In order to obtain high speed on the shaft 13, the gear 18 is formed at its forward end with a toothed clutch member 20, which is adapted to engage the toothed clutch member 21 on the pinion 9, so that upon shifting the clutch member 20 into engagement with the clutch member 21 the shaft 13 will be driven at the same rate of speed as the shaft 10 thereby giving direct drive or high speed. In order that the power may be transmitted to both the forward and rear ends of the gear casing there is provided a non-sliding gear 22 carried on the shaft 13 which meshes with a gear 23 mounted on the drive shaft 24, the forward end of which is provided with a suitable universal joint (not shown) which is adapted to be connected to the propeller shaft at its forward differential while the rear end of the shaft 24 is adapted to be connected to a suitable universal joint (not shown) to the propeller shaft at the rear differential.

In order to provide a means for shifting the gears, the rods 25 are slidable near the upper end of the gear housing and these rods are mounted in parallel relation and one of the rods is provided with a fork 26 for engaging the gear 18 and shifting the same, while the opposite rod is provided with a fork 27 for engaging and shifting the gear 16. The rods are provided with suitable teeth extending outwardly therefrom, designated by the character 28, which are spaced from each other a distance sufficient to receive the shifting rod or lever 8, whereby upon moving the lever into one of the longitudinal slots in the H plate the lever will engage the lugs or teeth on one of the rods, and upon moving the lever forwardly or rearwardly it will be seen that the rod will move to shift its respective gear in either direction. In view of the foregoing it will be seen that the shifting of the gears may be readily accomplished and the necessity of providing a separate driving means for the drive shaft of the vehicle the whole is contained within the housing of the transmission.

While in the foregoing there has been shown and described the preferred embodiment of the invention, it is to be understood that such changes may be made in the combination and arrangement of parts as will fall within the spirit and scope of the appended claims.

What is claimed is:

1. A transmission including a power shaft, a drive shaft, an idler shaft connected to the drive shaft, a counter shaft continuously driven by the power shaft, sliding gears on the idler shaft, and stationary gears on the counter shaft adapted to mesh with the sliding gears, whereby the speed of rotation of the idler shaft may be varied.

2. In a transmission, a power shaft, a counter shaft continuously driven from the power shaft, an idler shaft, a drive shaft, gears on the idler and drive shafts, said gears being constantly in mesh, pinions on the counter shaft, and sliding gears on the idler shaft adapted to mesh with the pinions on the counter shaft, whereby the idler shaft may be driven at varying speeds, and toothed clutch members carried on the power and idler shafts for meshing engagement, whereby the idler shaft will be driven direct from the power shaft.

3. A transmission gearing including a power shaft, an idler shaft alined with the power shaft but independently rotatable with respect thereto, a counter shaft, a pinion on the power shaft, a gear on the counter shaft meshing with the pinion, whereby upon rotation of the drive shaft the counter shaft will be driven, gears on the counter shaft non-sliding thereon, gears slidable on the idler shaft adapted to engage the non-sliding gears on the counter shaft, a drive shaft, and gears on the idler and on the drive shafts whereby upon rotation of the idler shaft the drive shaft will be rotated.

In testimony whereof I affix my signature in presence of two witnesses.

FREDERICK ELLWEIN.

Witnesses:
ORA E. SAHR,
J. OSMAN.

Copies of this patent may be obtained for five cents each, by addressing the "Commissioner of Patents, Washington, D. C."